United States Patent [19]

Kaul et al.

[11] Patent Number: 5,565,563
[45] Date of Patent: Oct. 15, 1996

[54] TRIPHENDIOXAZINE COMPOUNDS

[75] Inventors: Bansi L. Kaul, Biel-Benken, Switzerland; Peter Kempter, Lörrach, Germany

[73] Assignee: Sandoz Ltd., Basel, Switzerland

[21] Appl. No.: 349,114

[22] Filed: Dec. 2, 1994

[30] Foreign Application Priority Data

Dec. 6, 1993 [DE] Germany .................. 43 41 495.8

[51] Int. Cl.⁶ ................. C07D 498/14; C07D 498/22
[52] U.S. Cl. ................................... 544/74; 8/506
[58] Field of Search ............................... 544/74

[56] References Cited

U.S. PATENT DOCUMENTS

| T883,028 | 2/1971 | Newland et al. | 544/74 |
|---|---|---|---|
| 3,926,987 | 12/1975 | Dimroth et al. | 260/246 R |
| 4,246,196 | 1/1981 | Arndt et al. | 564/50 |
| 4,395,545 | 7/1983 | Adam et al. | 544/74 |
| 4,400,504 | 8/1983 | Harms et al. | 544/76 |
| 4,751,300 | 6/1988 | Fujita et al. | 544/74 |
| 5,041,629 | 8/1991 | Herd et al. | 562/37 |
| 5,126,481 | 6/1992 | Herd et al. | 562/37 |

FOREIGN PATENT DOCUMENTS

| 0012983 | 7/1980 | European Pat. Off. . |
|---|---|---|
| 0184712 | 6/1986 | European Pat. Off. . |
| 0184711 | 6/1986 | European Pat. Off. . |
| 0311969 | 4/1989 | European Pat. Off. . |
| 0355598 | 2/1990 | European Pat. Off. . |
| 0400429 | 12/1990 | European Pat. Off. . |
| 0489421 | 6/1992 | European Pat. Off. . |
| 0504922 | 9/1992 | European Pat. Off. . |
| 2245734 | 4/1975 | France . |
| 1142212 | 1/1963 | Germany . |
| 3433545 | 3/1986 | Germany . |
| 3444888 | 6/1986 | Germany . |
| 63-189871 | 5/1988 | Japan . |
| 92-173309 | 12/1994 | Japan . |
| 878661 | 10/1961 | United Kingdom . |

OTHER PUBLICATIONS

Chemical Abstract, vol. 69, 86056g (1968), Reichel.
Chemical Abstract, vol. 69, 47987s (1968), Baliut.

*Primary Examiner*—Philip I. Datlow
*Attorney, Agent, or Firm*—Robert S. Honor; Carl W. Battle; Carol A. Loeschorn

[57] ABSTRACT

Triphendioxazine compounds of formula I, in which $R_1$ and $R_2$ are either both hydrogen or form a single chain linking the 8,9-; 9,10- or 10,11-positions, the single chain having the formula $-NR_5-(CO)_m-NH-$, $-CR_5=CH-CO-NH-$, $-CO-CH_2-CO-NH-$, $-CO-CH=CR_5-NH-$, $-CO-NH-CO-NH-$, $-CO-NH-CR_6=N-$, $-CR_6=N-CO-NH-$, $-NR_5-(CO)_m-O-$ or $-NH-CR_5=N-$
where
  $R_5$ is hydrogen, $C_{1-4}$alkyl or phenyl, $R_6$ is hydrogen, $C_{1-4}$alkyl or phenyl;
  $m$ is 1 or 2 and $R_3$ and $R_4$ are either both hydrogen or form a single chain linking the 1,2-, 2,3- or 3,4-positions, the single chain having a formula selected from $-NR_5-(CO)_m-NH-$, $-CR_5=CH-CO-NH-$, $-O-CH_2-CO-NH-$, $-CO-CH=CR_5-NH-$, $-CO-NH-CO-NH-$, $-CONH-CR_6=N-$, $-CR_6=N-CO-NH-$, $-NR_5-(CO)_m-O-$ or $-NH-CR_5=N-$
where the symbols $R_5$, $R_6$ and m are defined above and
  when $R_3$ and $R_4$ are in the 1,2-position and $R_7$ is located in the 3-position or
  when $R_3$ and $R_4$ are in the 3,4-position and $R_7$ is located in the 2-position or
  when $R_1$ and $R_2$ are in the 8,9-position and $R_7$ is located in the 10-position or
  when $R_1$ and $R_2$ are in the 10,11-position and $R_7$ is in the 9-position
then $R_7$ is hydrogen or $C_{1-2}$alkoxy, otherwise $R_7$ is hydrogen, with the proviso that if $R_1$ and $R_2$ are hydrogen then $R_3$ and $R_4$ cannot be hydrogen.

These compounds are useful as pigments.

7 Claims, No Drawings

TRIPHENDIOXAZINE COMPOUNDS

The invention relates to new triphendioxazine compounds for use as pigments particularly in mass pigmenting of plastics material.

According to the invention, there is provided a compound of formula I,

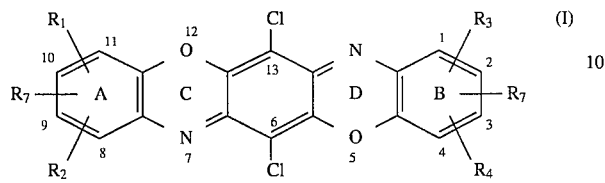

in which $R_1$ and $R_2$ are either both hydrogen or $R_1$ and $R_2$ together form a chain linking the 8,9-; 9,10- or 10,11-position, the single chain having a formula selected from $-NR_5-(CO)_m-NH-$, $-CR_5=CH-CO-NH-$, $-O-CH_2-CO-NH-$, $-CO-CH=CR_5-NH-$, $-CO-NH-CO-NH-$, $-CO-NH-CR_6=N-$, $-CR_6=N-CO-NH-$, $-NR_5-(CO)_m-O-$ or $-NH-CR_5=N-$
where $R_5$ is hydrogen, $C_{1-4}$alkyl or phenyl, $R_6$ is hydrogen, $C_{1-4}$alkyl or phenyl m is 1 or 2 and $R_3$ and $R_4$ are either both hydrogen or $R_3$ and $R_4$ together form a chain linking the 1,2-, 2,3- or 3,4-positions, the single chain having a formula selected from $-NR_5-(CO)_m-NH-$, $-CR_5=CH-CO-NH-$, $-O-CH_2-CO-NH-$, $-CO-CH=CR_5-NH-$, $-CO-NH-CO-NH-$, $-CONH-CR_6=N-$, $-CR_6=N-CO-NH-$, $-NR_5-(CO)_m-O-$ or $-NH-CR_5=N-$ where the symbols $R_5$, $R_6$ and m are defined above and when $R_3$ and $R_4$ are in the 1,2-position and $R_7$ is located in the 3-position or when $R_3$ and $R_4$ are in the 3,4-position and $R_7$ is located in the 2-position or when $R_1$ and $R_2$ are in the 8,9-position and $R_7$ is located in the 10-position or when $R_1$ and $R_2$ are in the 10,11-position and $R_7$ is in the 9-position then $R_7$ is hydrogen or $C_{1-2}$alkoxy, otherwise $R_7$ is hydrogen, with the proviso that if $R_1$ and $R_2$ are hydrogen then $R_3$ and $R_4$ cannot be hydrogen.

Preferably in $R_5$ and $R_6$, any $C_{1-4}$alkyl is ethyl or methyl.

Compounds of formula I can be prepared by condensing 1 mole of 2,3,5,6-tetrachloro-1,4-benzoquinone with 2 moles of a compound of formula II

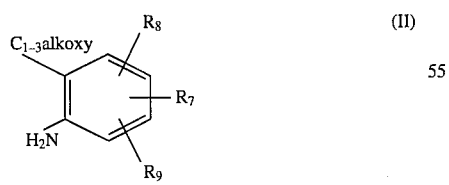

in which $R_8$ and $R_9$ have the meaning of $R_1$ and $R_2$ or of $R_3$ and $R_4$ respectively. If rings A and B in compounds of formula I are substituted differently, appropriate measures for asymmetric condensation have to be taken.

Compounds of formula II are known, for example as is described in D.O.S 2855883 or can be made from known compounds by known methods. 2,3,5,6-tetrachloro-1,4-benzoquinone is also known.

Preferably in the compounds of formula I, the ring A together with $R_1$ and $R_2$ forms a group of formula a) to o) below

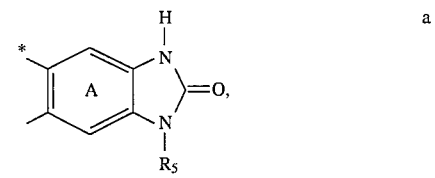

a

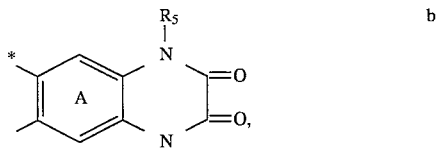

b

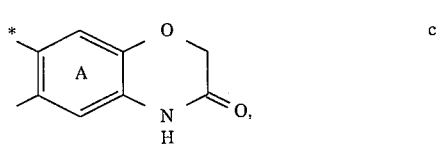

c

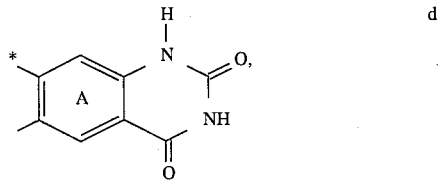

d

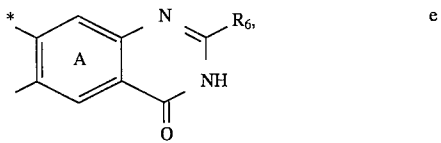

e

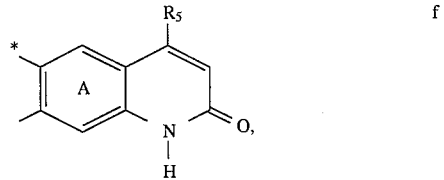

f

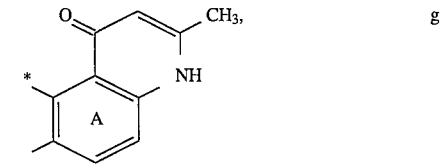

g

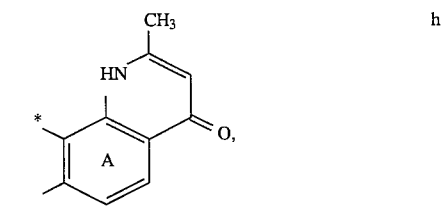

h

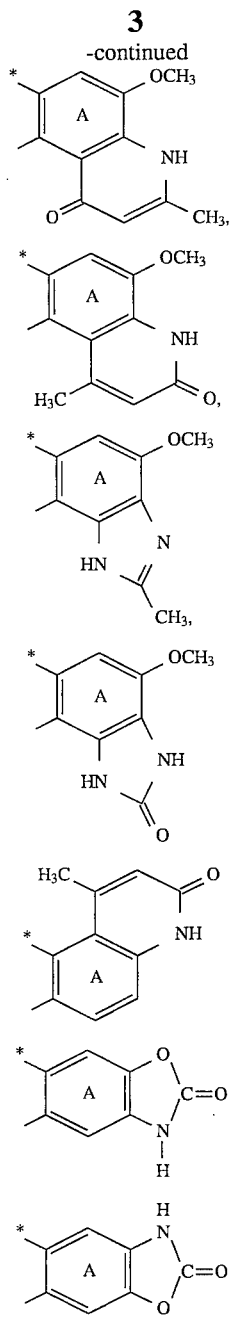
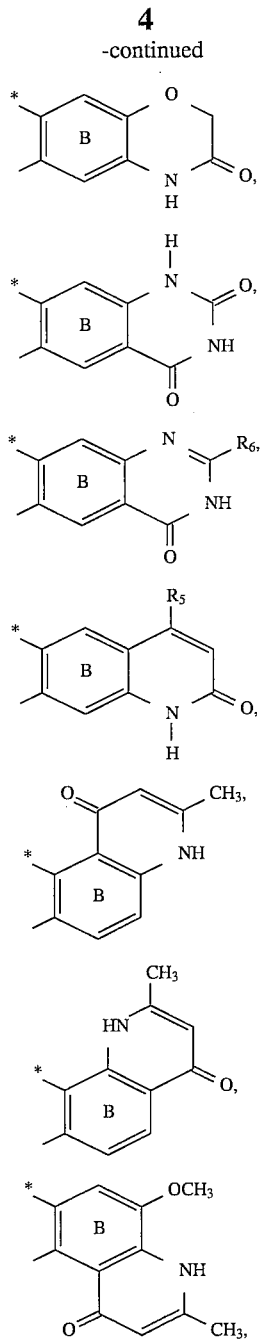
where the starred atom is attached to the nitrogen of ring C.
Preferably, in the compounds of formula I, the ring B together with $R_3$ and $R_4$ forms a group of formula a) to o) below
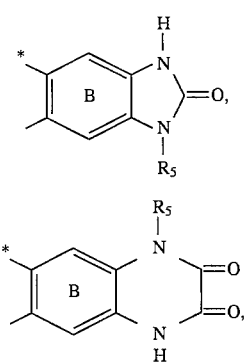
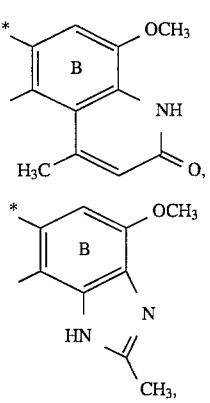

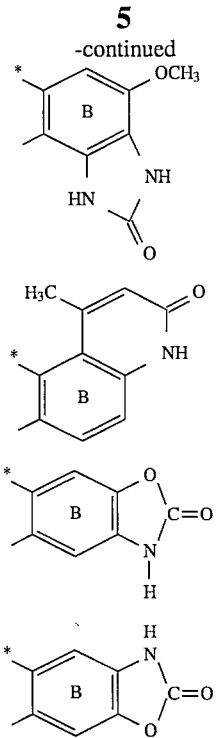

where the starred atom is attached to the N atom of ring D.

Preferably $R_5$ is $R_5'$ where $R_5'$ is hydrogen, methyl and ethyl.

Preferably $R_6$ is $R_6'$ when $R_6'$ is hydrogen, methyl or ethyl.

Most preferred compounds of formula I are the ones in which ring A together with $R_1$ and $R_2$ as well as ring B together with $R_3$ and $R_4$ form a group of formula a) or j).

The compounds of formula I are particularly useful as pigments for colouring plastics masses, including both solvent-free and solvent-containing masses of plastics or plastics resins. These include oil-based or aqueous paint systems and lacquers of various kinds. The compounds of formula I are also suitable for spin-colouring of viscose or cellulose acetate, for pigmenting of polyethylene, polystyrene, polyvinylchloride, rubber or artificial leather. They can also be used for printing inks in the graphic industry for colouring paper masses, for coating of textiles or for any other pigment printing process.

The resulting pigmentations have excellent fastness to heat, light and weathering and chemicals. The pigments retain good strength of colour and have good application properties, for example flocculation fastness, fastness to crystallisation and good dispersing properties. In particular, they have good fastness to migration, blooming, overcoating and solvents. An aftertreatment of the untreated pigment in organic solvent at elevated temperature, for example at 110°–200° C. can improve the pigment properties. Such organic solvents (in which the pigment itself is not dissolved) include chlorobenzene, nitrobenzene, dimethylformamide, dimethylacetamide, glacial acetic acid, ethylene glycol and quinoline. Preferably such aftertreatment is combined with a milling or kneading operation.

In the following Examples all parts and percentages are by weight and all temperatures are in °C. One part by volume is equivalent to the volume of one part by weight of water.

EXAMPLE 1

22 parts of 6-methoxy-5-aminobenzimidazolone (-2), 15 parts of chloroanil (2,3,5,6-tetrachlorobenzoquinone) and 10 parts of water-free sodium acetate are added to 250 parts by volume of ethanol. This mixture is heated to boiling whilst stirring well, the mixture is allowed to cool, the resulting intermediate that crystallises out is filtered, and it is then washed with water and dried.

26 parts of this intermediate are added to 150 parts by volume of $H_2SO_4$ conc. at a temperature below 10° and stirred at room temperature for 12 hours. This is then poured onto ice, the resulting pigment is filtered and then this is washed acid-free with water and is then dried at 60° C. under vacuum. Alternatively, the condensation product is diluted to 80% and the precipitated pigment filtered, washed with 300 parts of 80% $H_2SO_4$, followed by 150 parts of 50% $H_2SO_4$ and then washed acid free with 2000 parts of water. The humid presscake is suspended in 250 parts of dimethylacetamid and the remaining water distilled off between 100°–150°. After cooling to 120° the pigment is filtered, washed with 200 parts of cold dimethylacetamid, followed by 100 parts of isopropanol and then dried at 60° under vacuum.

The resulting pigment is of formula Ia

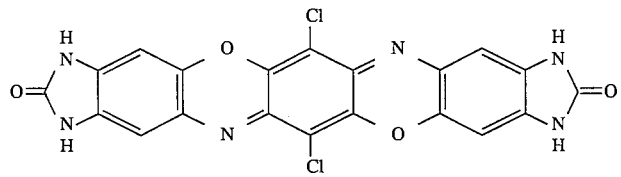

Ia which after aftertreatment colours plastics material such as PVC a violet tone with excellent migration and solvent fastness properties.

Aftertreatment: 20 parts of this pigment are put into a heated (70°–78°) kneader, 23 parts ethylene glycol and 160 parts NaCl are added and this mixture kneaded at 0.6 bar for two hours. Thereafter the mixture is suspended in 1500 parts water and heated at 80° for two hours. The hot mixture is filtered and the pigment obtained thereby is washed with 4000 parts hot water and dried in vacuo at 80°.

EXAMPLE 2

24 parts of 4-methyl-5,8-dimethoxy-6-amino-quinolone(-2), 12 parts of chloroanil and 8.5 parts of water-free sodium acetate in 300 parts by volume of ethanol are boiled for 6 hours whilst stirring well under reflux. The mixture is then brought down to room temperature and the resulting precipitate is washed with ethanol, water and again with ethanol. The ethanol-damp intermediate product is suspended in 300 parts of o-dichlorobenzene and forms a fine suspension. This is boiled for 8 hours while stirring well. The ethanol-dichlorobenzene mixture is then distilled off. The mixture is allowed to cool to 100° C., the product is filtered, the residue is then washed, first with hot o-dichlorobenzene, then with hot ethanol then with hot water and finally with cold water.

The product is then dried. The resulting pigment is of the formula 2a

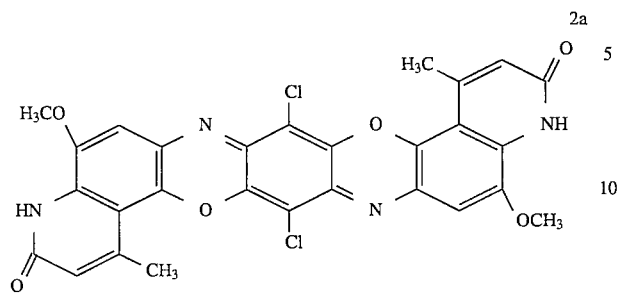

2a which after aftertreatment colours plastics material such as PVC a blue tone with good migration and solvent fastness properties.

Aftertreatment: 10 parts of this pigment are put into a ball mill with capacity of 0.5 liter together with 30 parts NaCl, 150 parts acetone and 1000 parts steel balls of 4 mm diameter and milled for 72 hours. The mixture is then sieved for separation from the balls, filtered and washed with 2000 parts water! The pigment is finally dried in vacuo at 80°.

EXAMPLES 3–15

Analogously to Example 1, a compound of formula I

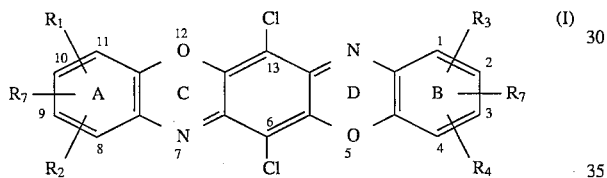

(I)

in which ring A together with groups $R_1$ and $R_2$ and ring B together with $R_3$ and $R_4$ are as in the Table below, can be prepared from appropriate reactants.

TABLE I

| Ex. | ring A with $R_1$ and $R_2$ | ring B with $R_3$ and $R_4$ |
|---|---|---|
| 3 | a | a |
| 4 | b | b |
| 5 | c | c |
| 6 | d | d |
| 7 | e | e |
| 8 | f | f |
| 9 | g | g |
| 10 | h | h |
| 11 | i | i |
| 12 | j | j |
| 13 | k | k |
| 14 | l | l |
| 15 | m | m |

The groups a–m are as follows:

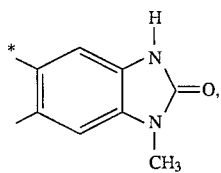

a

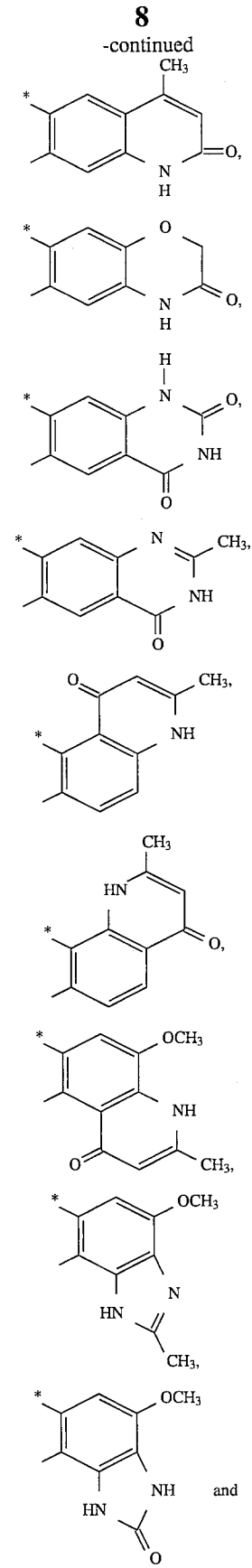

b c d e f g h i j and

-continued

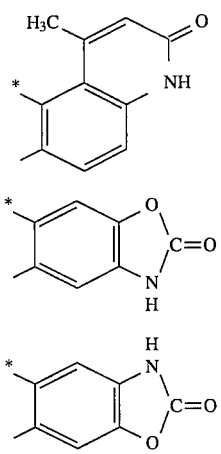

k l m where the carbocyclic rings are ring A or B respectively and the starred atoms attach to the N atom in ring C or D respectively.

Application Example A

A composition comprising:

4 parts of the pigment of Example 1 (which had been subjected to the aftertreatment) and 96 parts of a mixture of 50 parts of 60% solution of coco-aldehyde melamine resin solution in butanol 10 parts of xylene and 10 parts of ethyleneglycolmonoethylether are milled for 24 hours in a ball mill. The resulting dispersion is sprayed on an aluminium sheet, allowed to air-dry for 30 minutes and is then stored for 30 minutes at 120° C. A brilliant reddish-violet coated plate with very good migration fastness having good light and weather fastness results.

Application Example B

The preparation of a 0.1% coloured PVC sheet (ratio of coloured pigment to white pigment 1:5) is performed as follows:

16.5 parts of a softener made of equal parts of dioctylphthalate and dibutylphthalate are mixed with 0.05 parts of a pigment of Example 1 (which had been subjected to the aftertreatment) and 0.25 parts of titanium dioxide. 33.5 parts of polyvinylchloride are then added. The mixture is then passed between two rollers in a rolling mill to form a sheet (that is cut and re-rolled). One of the rollers is at a temperature of 40° C. and the other is at 140° C. The mixture is then conventionally extruded as a sheet and is pressed between two polished sheets for 5 minutes at 160° C.

The resulting reddish-violet coloured PVC sheet has a high brilliancy and very good migration and light fastness. Application Examples A and B can be repeated using the same amount of any one of the pigments of Examples 2 to 15.

What is claimed is:

1. A compound of formula I,

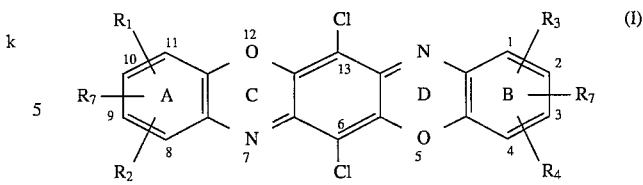

in which $R_1$ and $R_2$ are either both hydrogen or $R_1$ and $R_2$ together form a single chain linking the 8,9-; 9,10- or 10,11-positions, the single chain having a formula selected from $-NR_5-(CO)_m-NH-$, $-CR_5=CH-CO-NH-$, $-O-CH_2-CO-NH-$, $-CO-CH=CR_5-NH-$, $-CO-NH-CO-NH-$, $-CO-NH-CR_6=N-$, $CR_6=N-CO-NH-$, or $-NR_5-(CO)_m-O-$ where $R_5$ is hydrogen, $C_{1-4}$alkyl or phenyl, $R_6$ is hydrogen, $C_{1-4}$alkyl or phenyl;

m is 1 or 2 and $R_3$ and $R_4$ are either both hydrogen, or $R_3$ and $R_4$ together form a single chain linking the 1,2-, 2,3- or 3,4-positions, the single chain having a formula selected from $-NR_5-(CO)_m-NH-$, $-CR_5=CH-CO-NH-$, $-O-CH_2-CO-NH-$, $-CO-CH=CR_5-NH-$, $-CO-NH-CO-NH-$, $-CONH-CR_6=N-$, $-CR_6=N-CO-NH-$, or $-NR_5-(CO)_m-O-$ where the symbols $R_5$, $R_6$ and m are defined above and when $R_3$ and $R_4$ are in the 1,2-position and $R_7$ is located in the 3-position or when $R_3$ and $R_4$ are in the 3,4-position and $R_7$ is located in the 2-position or when $R_1$ and $R_2$ are in the 8,9-position and $R_7$ is located in the 10-position or when $R_1$ and $R_2$ are in the 10,11-position and $R_7$ is in the 9-position then $R_7$ is hydrogen or $C_{1-2}$alkoxy, otherwise $R_7$ is hydrogen, with the proviso that if $R_1$ and $R_2$ are hydrogen then $R_3$ and $R_4$ cannot be hydrogen.

2. A compound according to claim 1 in which, in the compounds of formula I, ring A together with $R_1$ and $R_2$ forms a group of formula a) to j(or l) to o) below,

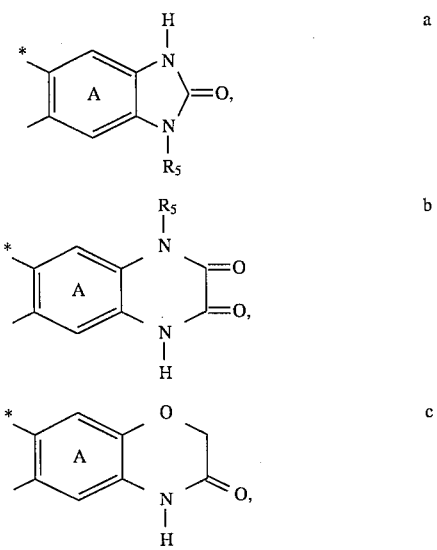

-continued
d
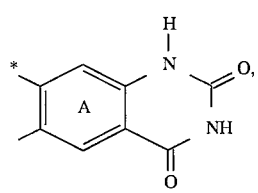
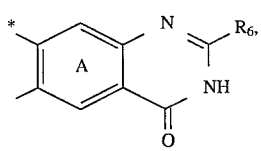
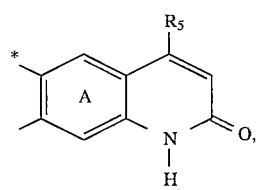
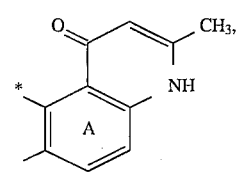
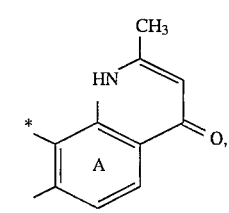
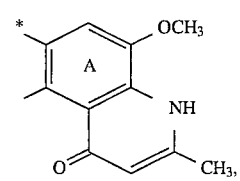
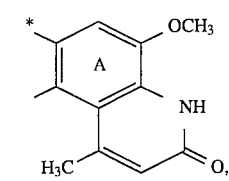
-continued
l
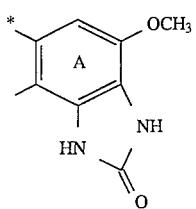
m
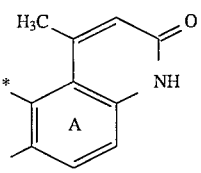
n
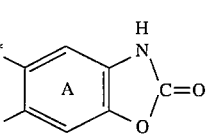
o
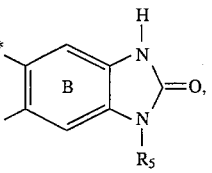
in which $R_5$ and $R_6$ are as defined in claim 1, and where the starred atom is attached to the N atom of ring C.
3. A compound according to claim 1 in which the ring B together with $R_3$ and $R_4$ forms a group of formula a) to j) or below
a
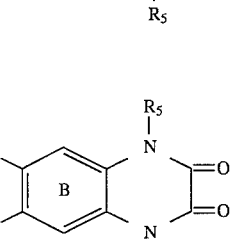
b
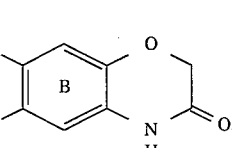
c
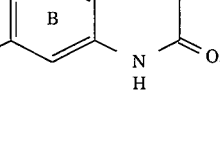

d
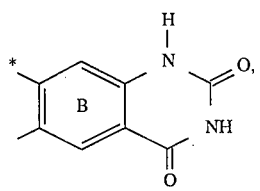
e
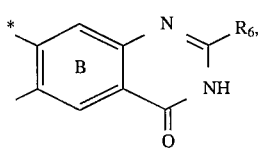
f
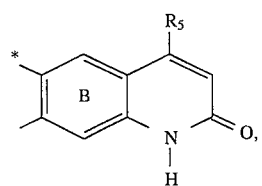
g
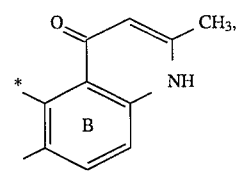
h
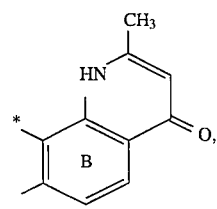
i
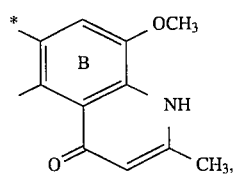
j
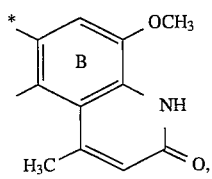
l
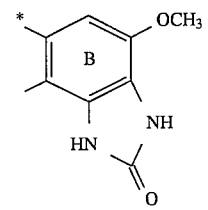
m
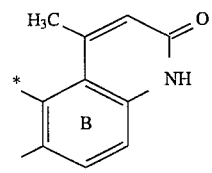
n
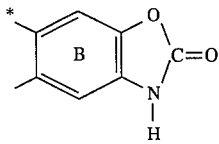
o
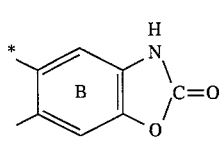
where $R_5$ and $R_6$ are as defined in claim 1 and where the starred atom is attached to the N atom of ring D.
4. A compound according to claim 1 in which $R_5$ is $R_5'$ where $R_5'$ is hydrogen, methyl or ethyl.
5. A compound according to claim 1 in which $R_6$ is $R_6'$ where $R_6'$ is hydrogen, methyl or ethyl.
6. A compound of formula Ia

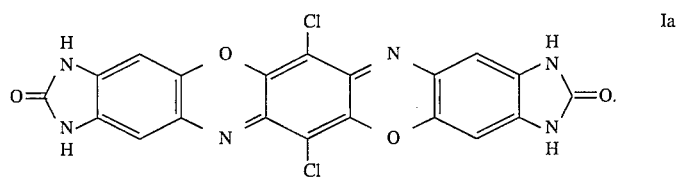
7. A compound of formula 2a
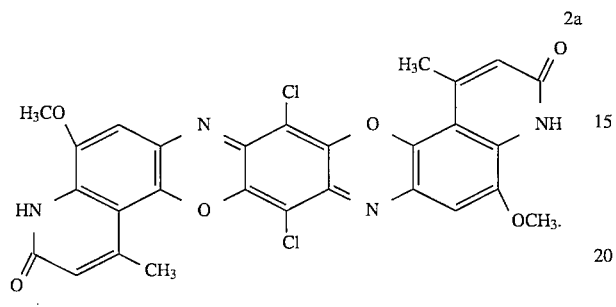
* * * * *